(12) United States Patent
Fröhlich et al.

(10) Patent No.: US 11,624,972 B2
(45) Date of Patent: Apr. 11, 2023

(54) PROJECTION DISPLAY (71) Applicant: DOCTER OPTICS SE, Neustadt an der Orla (DE)

(72) Inventors: Sven Fröhlich, Jena (DE); Sven B. Kiriczi, München Bayern (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 505 days.

(21) Appl. No.: 16/610,584

(22) PCT Filed: Apr. 27, 2018

(86) PCT No.: PCT/EP2018/060846
§ 371 (c)(1),
(2) Date: Nov. 4, 2019

(87) PCT Pub. No.: WO2018/210549
PCT Pub. Date: Nov. 22, 2018

(65) Prior Publication Data
US 2020/0159100 A1    May 21, 2020

(30) Foreign Application Priority Data
May 14, 2017 (DE) .......................... 102017004562.3

(51) Int. Cl.
*G03B 21/20* (2006.01)
(52) U.S. Cl.
CPC ................ *G03B 21/2033* (2013.01)
(58) Field of Classification Search
CPC .......... H01L 51/00–56; G02B 3/00–14; G03B 21/00–64
See application file for complete search history.

(56) References Cited

U.S. PATENT DOCUMENTS

| 5,498,444 A | 3/1996 | Hayes |
| 5,707,684 A | 1/1998 | Hayes et al. |
| 8,777,424 B2 | 7/2014 | Schreiber et al. |
| 2006/0158482 A1 | 7/2006 | Nakamura et al. |

(Continued)

FOREIGN PATENT DOCUMENTS

| DE | 102009024894 A1 | 12/2010 |
| DE | 102011076083 A1 | 11/2012 |

(Continued)

OTHER PUBLICATIONS

Y. Sung, et al. "Fabricating Optical Lenses by Inkjet Printing and Heat-Assisted in situ Curing of Polydimethylsiloxane tor Smartphone Microscopy", Journal of Biomedical Optics 20 (2015).

(Continued)

*Primary Examiner* — Bao-Luan Q Le
*Assistant Examiner* — Christopher A Lamb, II
(74) *Attorney, Agent, or Firm* — Barnes & Thornburg LLP (57) ABSTRACT

The present disclosure relates to a projection display, wherein the projection display comprises a support on which a projector lens array with a plurality of projector lenses is arranged, wherein on a side of the support facing away from the projector lens array, an object structure array with a plurality of object structures is arranged, wherein at least one projector lens is associated with one object structure, such that the projections of the object structures superpose through the projector lenses to form a full image.

17 Claims, 8 Drawing Sheets

(56) References Cited

U.S. PATENT DOCUMENTS

| | | | | |
|---|---|---|---|---|
| 2008/0186585 | A1* | 8/2008 | Mino | G02B 3/0012 |
| | | | | 359/620 |
| 2008/0310160 | A1 | 12/2008 | Kim et al. | |
| 2010/0181899 | A1* | 7/2010 | Forrest | H01L 51/5012 |
| | | | | 313/504 |
| 2011/0140151 | A1 | 6/2011 | Lee et al. | |
| 2012/0244643 | A1* | 9/2012 | Yamazaki | H01L 51/0096 |
| | | | | 438/4 |
| 2012/0262053 | A1* | 10/2012 | Tsuji | H01L 51/5275 |
| | | | | 313/498 |
| 2015/0001470 | A1* | 1/2015 | Ma | G02B 3/0056 |
| | | | | 257/40 |
| 2018/0010758 | A1 | 1/2018 | Mochizuki | |

FOREIGN PATENT DOCUMENTS

| | | |
|---|---|---|
| DE | 102013021795 A1 | 6/2015 |
| DE | 102015216985 A1 | 3/2017 |
| WO | 1999019900 A1 | 4/1999 |
| WO | 2004070438 A1 | 8/2004 |
| WO | 2008121414 A1 | 10/2008 |
| WO | 2012028809 A1 | 3/2012 |
| WO | 2018157964 A1 | 9/2018 |

OTHER PUBLICATIONS

W. Royall Cox, et al. "Low-cost Fiber Collimation for MOEMS switches by inkjet printing" MOEMS and Minaturized Systems II, M. Edward Motamedi, Rolf Goring, Editors, Proceedings of SPIE vol. 4561 (2001), p. 93-101.

International Preliminary Report on Patentability issued in connection with PCT/EP2018/060846 and dated Nov. 19, 2019.

PCT International Search Report and Written Opinion completed by the ISA/EP dated Aug. 1, 2018 and issued in connection with PCT/EP2018/060846.

* cited by examiner

PROJECTION DISPLAY

CROSS-REFERENCE TO RELATED APPLICATIONS

This application is a U.S. national counterpart application of international application serial No. PCT/EP2018/060846, filed Apr. 27, 2018, which claims priority to German Patent Application No. 102017004562.3 filed May 14, 2017.

BACKGROUND

The present disclosure relates to a(n) (integrated) projection display and a method of manufacturing a(n) (integrated) projection display. The present disclosure moreover relates to a method of manufacturing a projection display, comprising a(n) (integrated) microprojector, for example a(n) (integrated) microprojector.

SUMMARY

The present disclosure concerns a projection display which, for example, comprises one or several ones of the features mentioned in connection with an aforementioned microprojector or projection display, wherein the projection display comprises a support on which a projector lens array with a plurality of projector lenses is arranged (directly or indirectly), wherein on a side of the support facing away from the projector lens array, an object structure array with a plurality of, for example, identical or groupwise identical (cf. e. g. US 2018/001758A1; incorporated by reference) object structures is arranged, wherein at least one projector lens is associated with one object structure such that the projections (of a group) of the object structures superpose through the projector lenses to form a full image, wherein, for example, the distance between a projector lens and the associated object structure corresponds to the focal length of the respective projector lenses.

On the object structure array, an illumination layer for illuminating the object structures or projector lenses may be arranged. An illumination layer in the sense of present disclosure is for example a surface light emitter or for example a directed surface light emitter. An illumination layer in the sense of present disclosure is or comprises for example an LED layer or an OLED layer. An illumination layer in the sense of present disclosure is for example a directed layer, a directed LED or a directed OLED. A suited layer is disclosed, for example, in WO 2008/121414 A1 (incorporated by reference in its entirety). For example, an illumination layer in the sense of present disclosure can comprise the layers 303, 302 and 301 of WO 2008/121414 A1 or corresponding layers. An illumination layer in the sense of present disclosure for example comprises a transparent electrode and an, for example reflective, electrode. Between the transparent electrode and the, for example reflective, electrode, a light-emitting layer is for example arranged.

Moreover, the present disclosure concerns a method of manufacturing a projection display, wherein a support is provided and the illumination layer is introduced or applied on one side of the support of the object structure array and on the object structure array, wherein on a side of the support facing away from the object structure array, the projector lenses of the projector lens array are applied.

EMBODIMENTS OF THE PRESENT DISCLOSURE

The light-emitting layer may comprise a first region comprising an (for example organic) emitting material, and a second region comprising a low-index material having an index of refraction that is smaller than the index of refraction of the (organic) emitting material, wherein the second region is arranged (alternatingly) adjacent to the first region. In an embodiment, the low-index material has an index of refraction of 1.0 to 3.0. In a further embodiment, the low-index material has an index of refraction of 1.0 to 1.5.

In a further embodiment, the low-index material forms a grid which is oriented in a plane parallel to the transparent electrode and/or to the reflective electrode. In a further embodiment, the grid is designed with a periodicity that is greater than the wavelength of light.

In a further embodiment, the second region is arranged next to or adjacent to the first region, for example multiply repeating (alternatingly).

Figure 13:
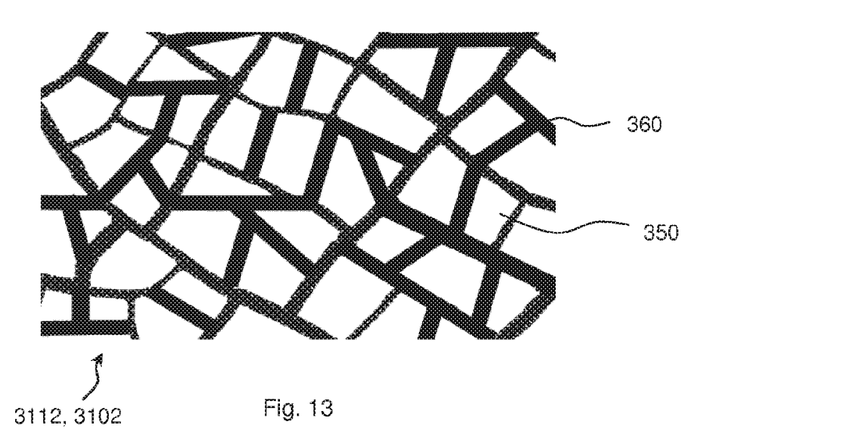
FIG. 13 shows a further exemplified embodiment of a light-emitting layer.

The second region is optionally arranged next to or adjacent to the first region, for example multiply repeating. In a further embodiment, the low-index material forms an for example regular or irregular grid which is oriented in a plane parallel to the transparent electrode and/or to the reflective electrode. The grid may be designed to be periodic or irregular or alternating, respectively. For example, the grid may have an irregular design, for example as it is disclosed in FIG. 2b, 3b, or FIG. 4b of WO 2012/028809 A1 (also see FIG. 13). The distance between the low-index material may be reduced in one direction, or the width of the first region (with the (for example organic) light-emitting material) is increased (cf. for example FIG. 14). The luminous power of the light-emitting layer may be reduced in one direction, e. g. by reducing the layer thickness of the light-emitting layer in one direction, optionally in connection with one or several ones of the measures mentioned herein. This is for example to serve the compensation of the illumination power when the projection display is directed onto an inclined surface and the projected area is thus oblique. Here, for example a distortion of the projection due to an oblique surface is to be compensated, or at least partially compensated, by a stronger light emission.

In a further embodiment, the periodicity is not greater than five times the width of the grid lines. In a further embodiment, the periodicity is not greater than four times the width of the grid lines. In a further embodiment, the mean width of the first region is not more than five times, for example not more than four times, for example not more than three times the mean width of the second region. In a further embodiment, the periodicity is not greater than three times the width of the grid lines. In a further embodiment, the periodicity or period, or the mean distance between grid lines is not more than three times or not more than four times or not more than five times the for example mean width of the grid lines. The distance or the mean distance runs, in the sense of present disclosure, for example in a plane parallel to the transparent electrode and to the reflective electrode.

In a further embodiment, the low-index material consists of aerogel, Teflon, graded thin-layer $SiO_2$, graded thin-layer $TiO_2$, and/or layers of $SiO_2$ nanorods. In a further embodiment, the low-index material comprises aerogel, Teflon, graded thin-layer $SiO_2$, graded thin-layer $TiO_2$, and/or layers of $SiO_2$ nanorods.

To achieve the object, it is moreover suggested to print, for example, individual lenses of a projection display, for example, a projection display with one or several ones of the above-mentioned features (by means of a 3D printing method or by means of a printing method, e. g. 3D-inkjet printing), wherein the projection display, for, comprises a support on which a projector lens array with a plurality of projector lenses is arranged, wherein on a side of the support facing away from the projector lens array, an object structure array with a plurality of for example identical or groupwise identical (cf. e. g. US 2018/0010758A1; incorporated by reference) object structures is arranged, wherein at least one projector lens is associated with one object structure such that the projections of the object structures superpose through the projector lenses to form a full image, wherein for example the distance between a projector lens and the associated object structure corresponds to the focal length of the respective projector lenses, and wherein on the object structure array, an illumination layer for illuminating the object structures or projector lenses is arranged.

A hybrid polymer ink, for example, is used for printing. As starting material of the ink, for example, inorganic-organic hybrid polymers, so-called Omocers, are provided. These are mixed, depending on the marginal conditions of the printing method, with solvent or other diluting agents (e. g. so-called reactive diluting agents) to adjust the viscosity of the ink. For example, several droplets are printed onto one point to build up a drop (microlens after its curation) which consists of several droplets or comprises several droplets. According to the terminology of this disclosure, a droplet is a portion of ink exiting from a print head. One drop is the volume of ink building up on a support, such as a substrate or a coated substrate, if several droplets are printed onto one point. Suited printing methods are disclosed, for example, in the article W. Royall Cox, Ting Chen, Donald J. Hayes, Michael E. Grove: "Low-cost fiber collimation for MOEMS switches by ink-jet printing", MOEMS and Miniaturized Systems II, M. Edward Motamedi, Rolf Göring, Editors, Proceedings of SPIE Vol. 4561 (2001), p. 93-101. Here, the drops or the microlenses formed from the drops optionally do not touch each other (in contrast to DE 10 2009 024 894 A1).

For example the microlenses built up from the droplets are customized. That means, for example, that at least two, however optionally several microlenses (e. g. of a microprojector or a projection display) differ from each other. Here, corresponding microlenses of different microprojectors of one batch for example differ from each other. For example, the microlens with the coordinates i, j (i. column from the left, therein, j. projector lens from the top) of a first microprojector or a projection display (of a batch) may be formed of a different number of droplets than a microlens with the coordinates i, j of a second microprojector or a projection display (of the batch). For example, the number of droplets for one microlens is individually controlled or selected or calculated or determined, respectively. The term microlens relates to projector lenses or to projector lenses and condenser lenses.

In one embodiment, a substrate (the terms "substrate" and "support" are used as synonyms in this disclosure) is provided. The optical useful layer, i. e. the object to be imaged (=identical structure to be imaged) is directly or indirectly applied onto the substrate. For example, the side of the substrate with the objects to be imaged (=identical structure to be imaged) and/or its side of the substrate facing away is coated. Coatings are suggested, for example, in DE 10 2013 021 795 A1 and WO99/19900. As, for example, in WO99/19900 (incorporated by reference in its entirety), US 2006/0158482 A1 (incorporated by reference in its entirety), or WO 2004/070438 A1 (incorporated by reference in its entirety), coating islands may be provided instead of a continuous coating. At least two coating islands may differ as concerns their materials and/or their geometries (for example their diameters). A suited material is, for example, selected such that it permits, by the wetting properties of the selected material for the coating island, the building of a desired microlens or a desired drop. The size or the shape of the microlens or the drop is adjusted by the number of droplets (and optionally by the wetting properties (of the ink and the solvent content)). Optionally, the support may be heated. Details can be taken, for example, from the article Y. Sung et al., Journal of Biomedical Optics 20 (2015) (incorporated by reference in its entirety).

Corrected desired optical parameters of the microlens are for example calculated depending on the desired optical parameters and depending on (measured) properties of the coating island, such as the layer thickness. An optical parameter may be, for example, the focal length. From the corrected desired optical parameters, the number of droplets printed onto one point to produce a microlens or a drop are determined, for example, by means of a suited characteristic, as it is disclosed, for example, in W. Royall Cox, Ting Chen, Donald J. Hayes, Michael E. Grove: "Low-cost fiber collimation for MOEMS switches by ink-jet printing", MOEMS and Miniaturized Systems II, M. Edward Motamedi, Rolf Göring, Editors, Proceedings of SPIE Vol. 4561 (2001), p. 93-101 (see therein FIG. 11), Suited methods for adjusting the drop's shape or the corresponding microlens (=drop) are disclosed in W. Royall Cox, Ting Chen, Donald J. Hayes, Michael E. Grove: "Low-cost fiber collimation for MOEMS switches by inkjet printing", MOEMS and Miniaturized Systems II, M. Edward Motamedi, Rolf Göring, Editors, Proceedings of SPIE Vol. 4561 (2001), p. 93-101 (incorporated by reference in its entirety), U.S. Pat. No. 5,498,444 (incorporated by reference in its entirety), and U.S. Pat. No. 5,707,684 (incorporated by reference in its entirety).

The number of droplets may also be determined directly, and not initially indirectly, depending on the desired (optical) parameters and depending on (measured) properties of the coating island, such as the layer thickness. In this case, the characteristic is replaced by a characteristic field.

A characteristic or a characteristic field may be implemented as a table, a look-up table, a neuronal network, and/or a (numerical) function, such as e. g.:

$$V^*_{KORR}(\Delta S, \Delta d) = \frac{h^2 \pi}{3}(3R - h)$$

with $$h = R - \sqrt{R^2 - \frac{(d^* + \Delta d)^2}{4}}$$

and $$R = \frac{(S + \Delta S)(n_S - n)}{n_S}$$

Herein, $S^*$ is the desired value of the support $\Delta S^*$ is the deviation of the actual value of the thickness of the support from the desired value of the thickness of the support $n_S$ is the index of refraction of the material of the microlens $n$ is the index of refraction of air $d^*$ is the desired value of the diameter of the coating island onto which the microlens is printed, or the desired value of the diameter of the base of the microlens, $\Delta d$ is the deviation of the actual value of the diameter of the coating island onto which the microlens is printed, from the desired value of the diameter of the coating island onto which the microlens is printed.

For example, the drop (=microlens) is exposed directly or later, after the application of the desired number of droplets, for example by UV radiation. In this manner, curing is achieved. The described method is optionally applied to both sides of the substrate. However, it is also possible to only print the projector lenses, not, however, the condenser lenses. A hybrid method may be provided in which the condenser lenses are embossed (e. g. by UV molding), and the projector lenses are printed.

In another embodiment, the objects to be imaged are modifiable or individually controllable. In this manner, different projection patterns may be achieved (see DE 10 2009 024 894 A1). For example, an arrow may be projected in front of a motor vehicle which points either to the left or to the right, depending on how the objects that are imaged are controlled. The projection pattern and thus the control of the objects may also be adjusted in response to the key or the ignition key of a motor vehicle. That means, the user of the one key obtains a different projection from that of the user of another key.

A microlens in the sense of present disclosure is for example a lens whose diameter is smaller than 1 mm. Printing on a point or on one point is to include for example, in the sense of present disclosure, that printing is effected exactly on this point, or that printing is at least effected in the region where the microlens is to be formed. A batch of microprojectors or projection displays in the sense of present disclosure is for example a quantity of microprojectors or projection displays made from one wafer. A batch of microprojectors or projection displays may also be, in the sense of present disclosure, a quantity of microprojectors made from wafers of one wafer batch.

The term "integrated" for example means, in the sense of present disclosure, "combined into a unit".

DETAILED DESCRIPTION

Figure 1:
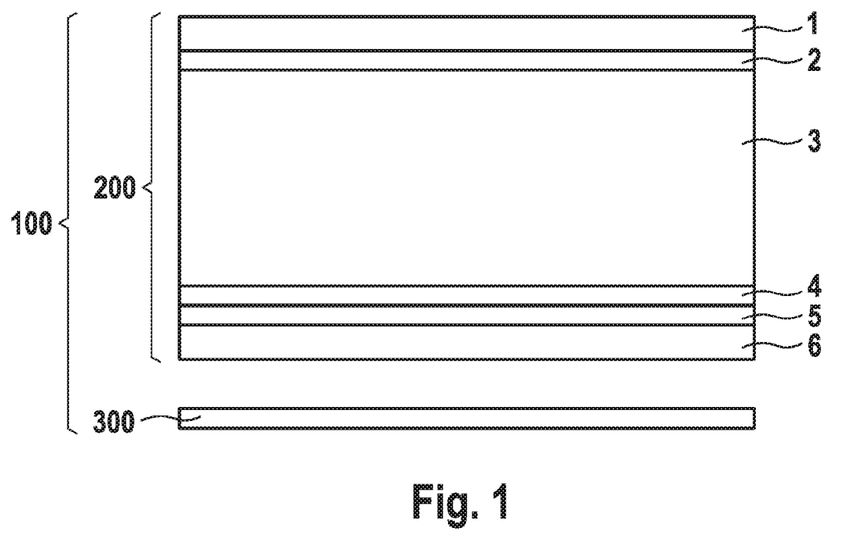
FIG. 1 shows a basic structure of a projection display.

FIG. 1 shows a basic structure of a projection display 100 according to PCT/EP2018/000049. The projection display 100 comprises a microprojector 200 and a light source 300 for illuminating the microprojector 200. The microprojector 200 comprises a substrate 3 or a support on which a coating layer 2 may be arranged. A projector lens layer 1 is arranged on the coating layer 2 or directly on the substrate 3. On the side of the substrate 3 facing away from the projection layer 1, an object layer 4 with object structures to be imaged is arranged. On the object layer 4, a coating layer 5 is optionally arranged on which in turn a condenser lens layer 6 is arranged. The condenser lens layer 6 may also be directly arranged on the object layer 4.

Figure 2:
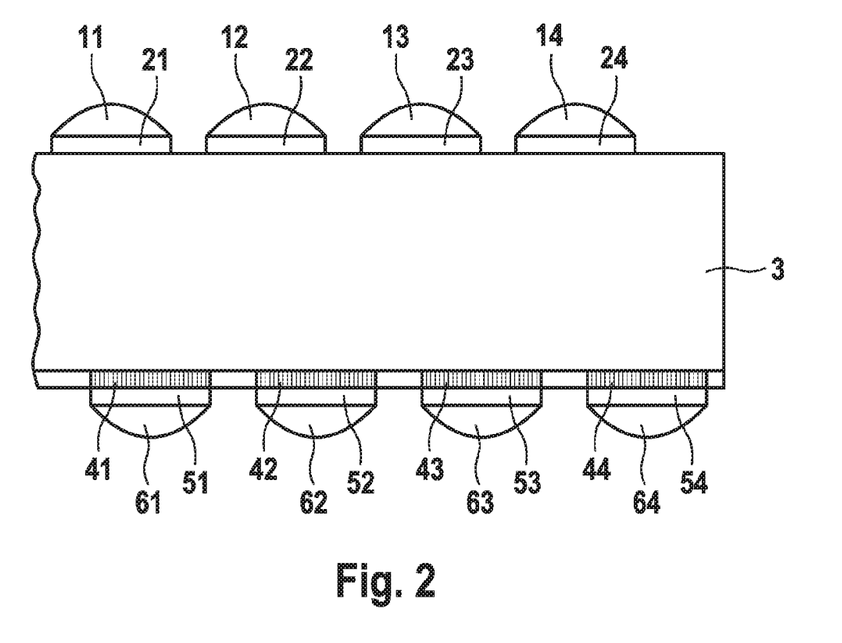
FIG. 2 shows an exemplified embodiment of a microprojector.

FIG. 2 shows an exemplified embodiment of a microprojector according to PCT/EP2018/000049. Here, coating islands 21, 22, 23, 24 are arranged on a substrate 3. On the coating islands 21, 22, 23, 24, microlenses 11, 12, 13, 14, for example of hybrid polymer, are arranged. The projector lenses 11, 12, 13, 14 are part of a projector lens array. On the side of the substrate facing away from the projector lens array, object structures 41, 42, 43, 44 are arranged and imaged by means of the projector lens array or by means of the projector lenses 11, 12, 13, 14. Thus, the projector lens 11 images the object structure 41, the projector lens 12 images the object structure 42, the projector lens 13 images the object structure 43, and the projector lens 14 images the object structure 44. In this sense, the projector lens 11 and the object structure 41 form an optical channel, the projector lens 12 and the object structure 42 form an optical channel, the projector lens 13 and the object structure 43 form an optical channel, and the projector lens 14 and the object structure 44 form an optical channel.

On the object structures 41, 42, 43, 44, one intermediate coating with coating islands 51, 52, 53, 54 each is optionally provided. On the optional coating islands 51, 52, 53, 54, a condenser lens array with condenser lenses 61, 62, 63, 64 is arranged. The condenser lenses 61, 62, 63, 64 are for example made of hybrid polymer material. By means of the condenser lens array, a Köhler illumination pattern is implemented.

Figure 3:
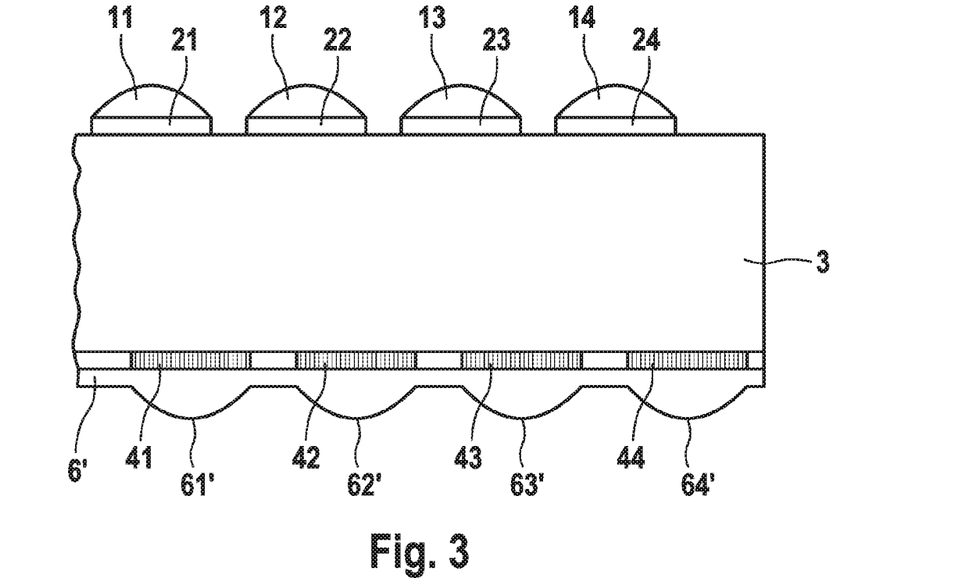
FIG. 3 shows a further exemplified embodiment of a microprojector.

FIG. 3 shows a further exemplified embodiment of a microprojector according to PCT/EP2018/000049. In variation to the exemplified embodiment according to FIG. 2, here a condenser lens array layer 6' is arranged on the object structures 41, 42, 43, 44 which layer comprises condenser lenses 61', 62', 63', 64' or into which layer condenser lenses 61', 62', 63', 64' are embossed.

Figure 4:
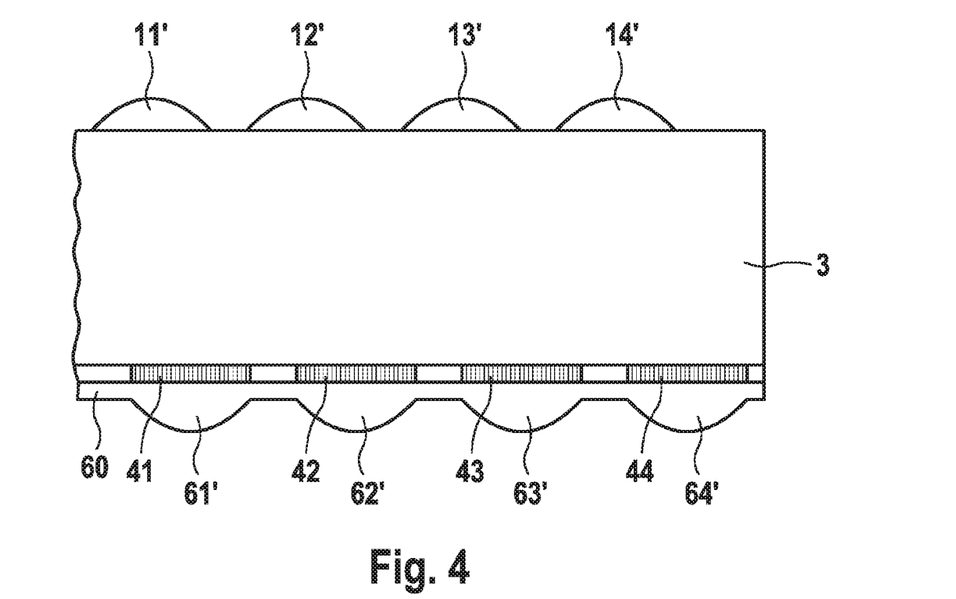
FIG. 4 shows a further exemplified embodiment of a microprojector.

FIG. 4 shows a further exemplified embodiment of a microprojector according to PCT/EP2018/000049. Here, in variation to the microprojector in FIG. 3, the projector lenses 11', 12', 13' and 14' are printed directly onto the substrate 3, however, the surface of the substrate 3 underneath the projector lenses 11', 12', 13' and 14' is modified or heated in the sense of a suited wetting capacity (cf. Y. Sung et al., Journal of Biomedical Optics 20 (2015) (incorporated by reference in its entirety).

Figure 5:
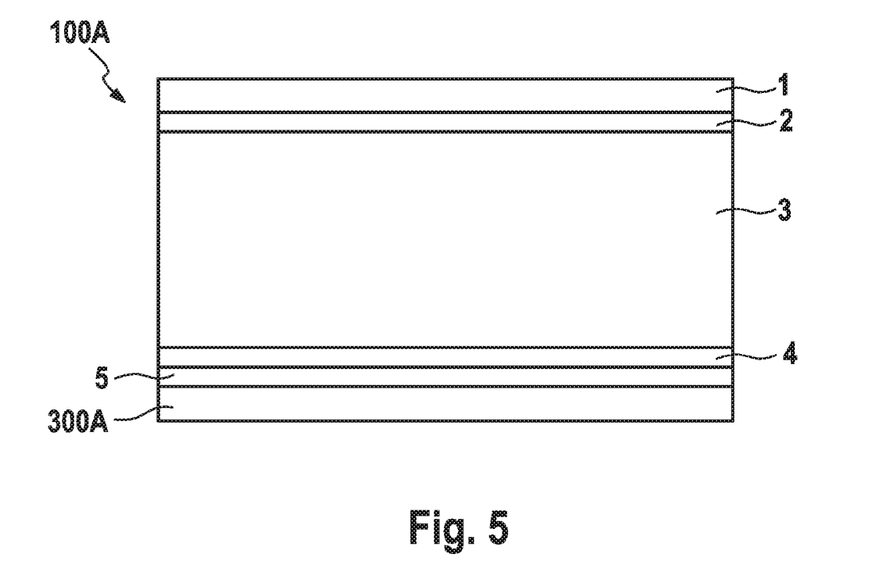
FIG. 5 shows a basic structure of a modified projection display.

FIG. 5 shows a basic design of a projection display 100A varied with respect to PCT/EP2018/000049. The same reference numerals as in the other figures (here) designate the same—at least, however, similar—elements. The projection display 100A comprises a substrate 3 or a support on which a coating layer 2 may be arranged. On the coating layer 2, or on the substrate 3 directly, a projector lens layer 1 is arranged. On the side of the substrate 3 facing away from the projector layer 1, an object layer 4 with object structures to be imaged is arranged. On the object layer 4, a coating layer 5 is optionally arranged, and thereon, an illumination layer 300A is arranged. The illumination layer 300A may also be arranged directly on the object layer 4. The illumination layer 300A serves to illuminate the object layer 4 or the projection layer 1.

Figure 6:
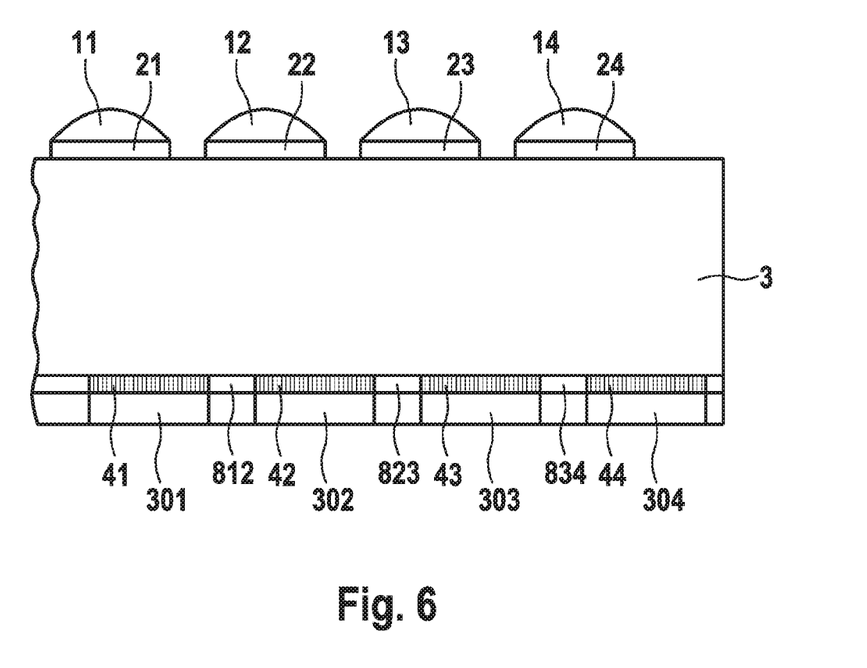
FIG. 6 shows an exemplified embodiment of a projection display according to the variation corresponding to FIG. 5.

FIG. 6 shows an exemplified embodiment of a projection display corresponding to the projection display 100A. Here, coating islands 21, 22, 23, 24 are arranged on a substrate 3. On the coating islands 21, 22, 23, 24, microlenses 11, 12, 13, 14, for example, of hybrid polymer, are arranged. The projector lenses 11, 12, 13, 14 are part of a projector lens array. On the side of the substrate facing away from the projector lens array, object structures 41, 42, 43, 44 are arranged which are imaged by means of the projector lens array or by means of the projector lenses 11, 12, 13, 14. Thus, the projector lens 11 images the object structure 41, the projector lens 12 images the object structure 42, the projector lens 13 images the object structure 43, and the projector lens 14 images the object structure 44. In this sense, the projector lens 11 and the object structure 41 form an optical channel, the projector lens 12 and the object structure 42 form an optical channel, the projector lens 13 and the object structure 43 form an optical channel, and the projector lens 14 and the object structure 44 form an optical channel. Between the object structures 41, 42, 43 and 44, intermediate elements 812, 823, 834 may be provided which may be, for example, opaque. On the object structure 41, a directed surface light source 301, as it is disclosed, for example, in WO 2008/121414 A1, is provided. Correspondingly, on the object structures 42, 43 and 44, too, corresponding surface light sources 302, 303 and 304 are arranged.

Figure 7:
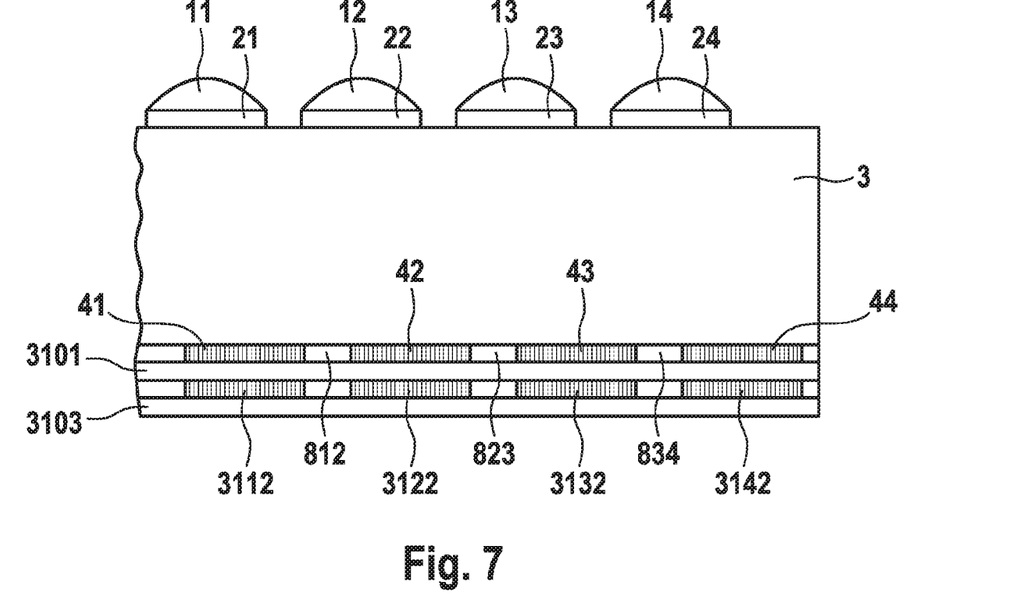
FIG. 7 shows a further exemplified embodiment of a projection display according to the variation corresponding to FIG. 5.

FIG. 7 shows a further exemplified embodiment of a projection display corresponding to the projection display 100A. Here, corresponding to the exemplified embodiment according to FIG. 6, microlenses 11, 12, 13, 14 on coating islands 21, 22, 23, 24, and a substrate 3 and the object structures 41, 42, 43, 44 are provided.

On the object structures, a transparent electrode layer 3101 is provided (directly or indirectly). Moreover, a reflective electrode layer 3103 is provided. Between the reflective electrode layer 3103 and the transparent electrode layer 3101, light-emitting layer sections 3112, 3122, 3132 and 3142 are provided. The light-emitting layer sections 3112, 3122, 3132 and 3142 are, for example, designed as directed surface light emitters, for example, as directed LEDs or directed OLEDs. They may be designed, by way of example, according to the layer 302 of WO 2008/121414 A1.

Figure 8:
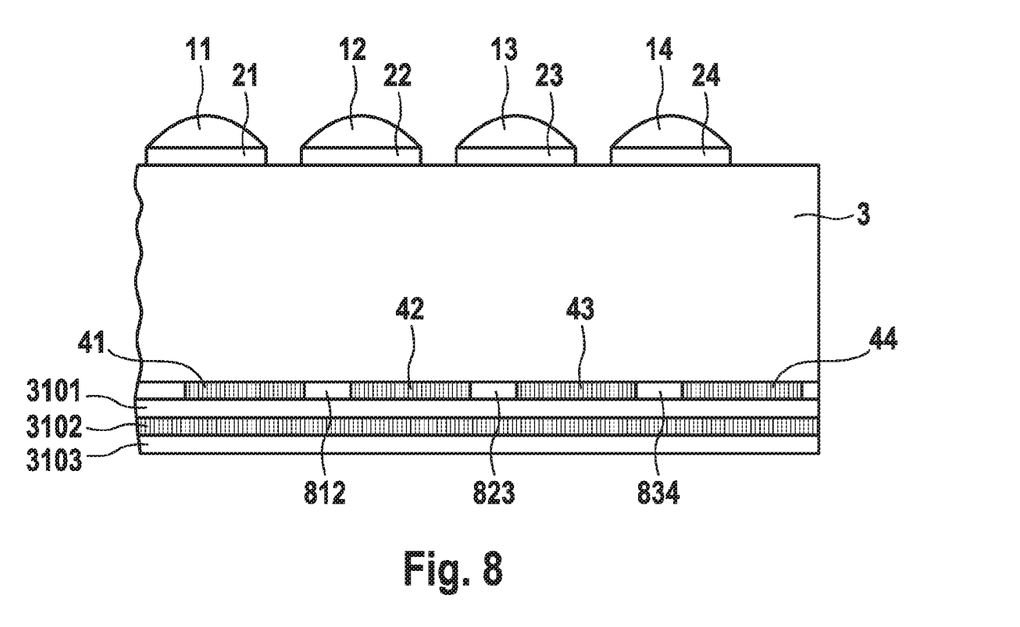
FIG. 8 shows a further exemplified embodiment of a projection display according to the variation corresponding to FIG. 5.

FIG. 8 shows a variation of the projection display according to FIG. 7, wherein instead of the light-emitting layer sections 3112, 3122, 3132 and 3142, a light-emitting layer 3102 is provided. For example, the opaque intermediate elements 812, 823 and 834 are designed to be reflective or mirror-like in the direction of the transparent electrode 3101.

With respect to the exemplified embodiments of the projection displays according to FIG. 6, FIG. 7 and FIG. 8, instead of the coating islands 21, 22, 23, 24 with the microlenses 11, 12, 13 and 14, microlenses 11', 12', 13', 14' corresponding to FIG. 4 may also be used or are usable.

Figure 9:
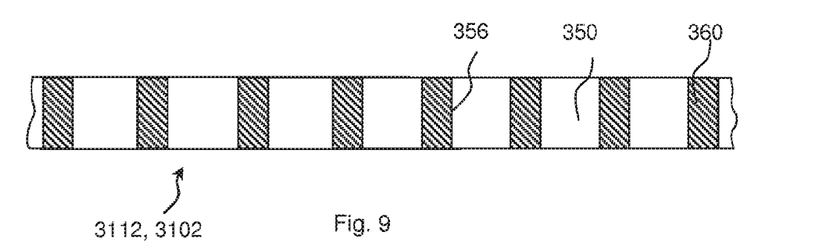
FIG. 9 shows an exemplified embodiment of a light-emitting layer.
Figure 10:
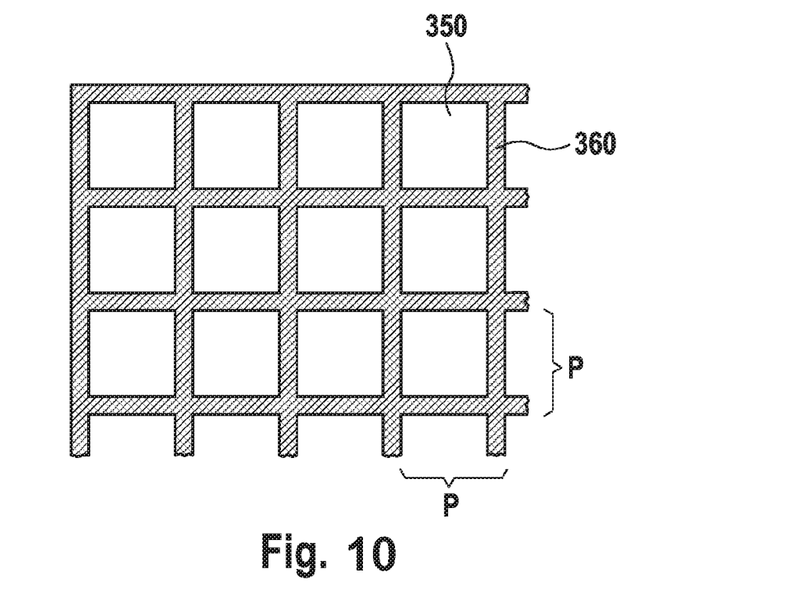
FIG. 10 shows a further exemplified embodiment of a light-emitting layer.
Figure 11:
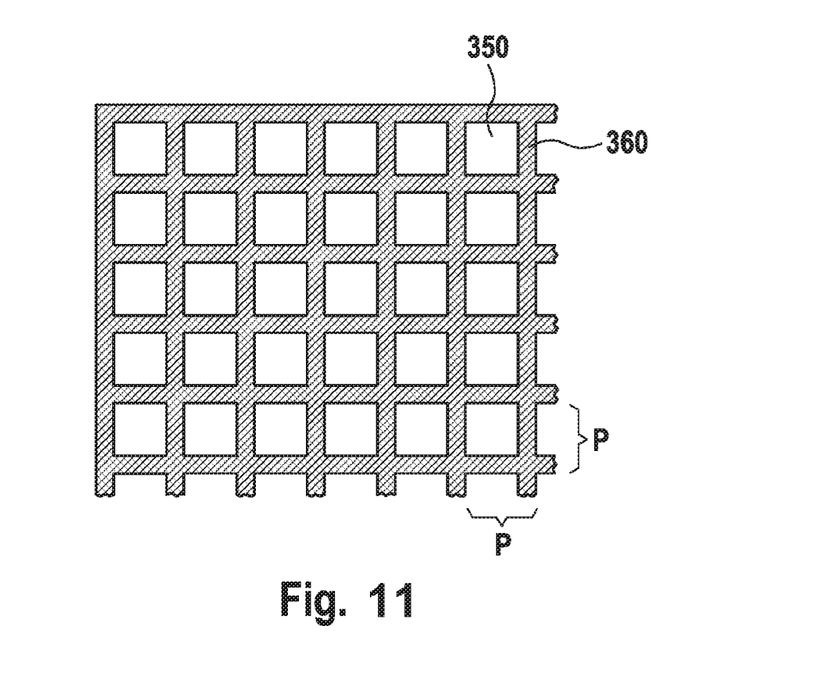
FIG. 11 shows a further exemplified embodiment of a light-emitting layer.

FIG. 9 (cross-section), FIG. 10 (plan view) and FIG. 11 (plan view) show exemplified embodiments for the design of the light-emitting layer sections 3112, 3122, 3132 and 3142 and the light-emitting layer 3102. The light layers, i.e. the light-emitting layer sections 3112, 3122, 3132 and 3142 and the light-emitting layer 3102, comprise a first region 350, comprising a for example organic, light-emitting material, and a second region 360, comprising a low-index material having an index of refraction that is smaller than the index of refraction of the for example organic, light-emitting material, wherein the low-index material comprises an index of refraction of 1.0 to 3.0, for example, 1.0 to 1.5. The low-index material consists of or comprises e. g. aerogel, Teflon, graded thin-layer $SiO_2$, graded thin-layer $TiO_2$, and/or layers of $SiO_2$ nanorods. The first region 350 and the second region 360 are arranged alternatingly and/or repeatedly alternatingly.

The interface 356 between the first region 350 and the second region 360 may extend orthogonally or essentially orthogonally with respect to the electrodes or to the light-emitting layer. The interface may also extend, as represented in FIG. 3B in WO 2008/121414 A1, inclined with respect to the orthogonal. Moreover or as an alternative, the interface 365 between the first region 350 and the second region 360 may extend, as is represented in FIG. 3C of WO 2008/121414 A1, irregularly in a sense such that it is no smooth interface.

The low-index material forms, for example, a grid that is oriented in a plane parallel to the transparent electrode and to the reflective electrode. Moreover, the grid is designed with a periodicity P that is higher than the wavelength of light. In a further embodiment, the periodicity P is not greater than three times the width of the grid lines, as is represented in FIG. 10. In an advantageous embodiment, the periodicity P is not higher than four times the width of the grid lines, as is represented in FIG. 11.

Figure 12:
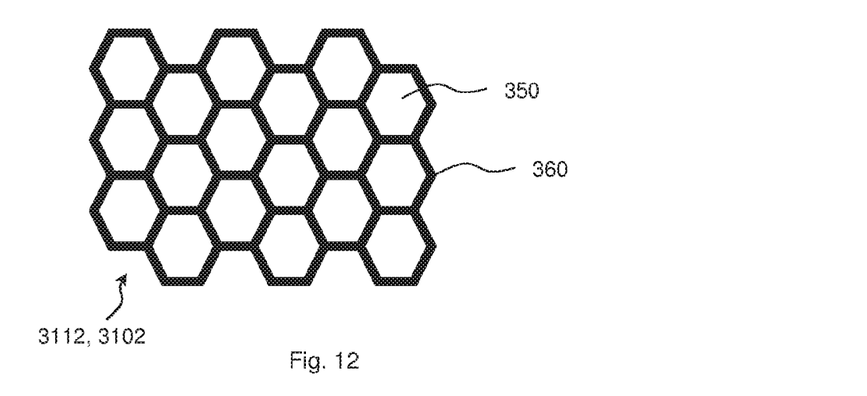
FIG. 12 shows a further exemplified embodiment of a light-emitting layer.

The grid may also be embodied as a honeycomb structure, as is represented e. g. in FIG. 12.

Moreover, the grid may be embodied irregularly alternatingly, for example as is represented in WO 2012/028809 A1. One exemplified embodiment for the irregular alternating arrangement or alternation of the first region and the second region is shown, for example, in FIG. 13, wherein reference numeral 350 also designates the first region and reference numeral 360 designates the second region.

In contrast to WO 2008/121414 A1, there is no optimisation with respect to an optimal light efficiency; the width of the first region 350 and/or the width of the second region 360 is rather optimised with the auxiliary condition of a certain minimum luminous power such that the light is emitted preferably in a collimated or orthogonal manner with respect to the light-emitting layer, or preferably as orthogonal as possible or largely orthogonal with respect to the light-emitting layer in the direction onto the object structures.

Figure 14:
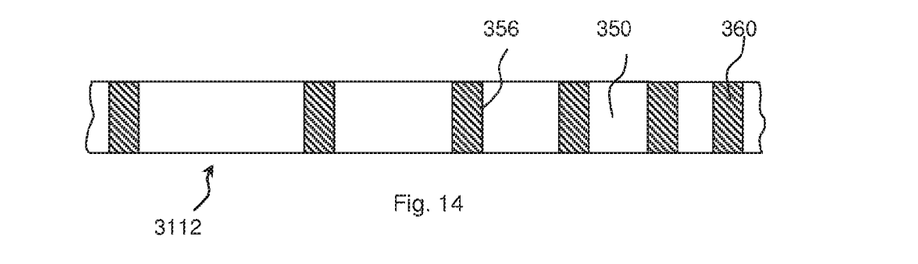
FIG. 14 shows a further exemplified embodiment of a light-emitting layer.

As is represented, for example, in FIG. 14, the width of the first region 350 and/or the second region 360 may be reduced in a certain direction (for example linearly or continuously). This is provided correspondingly for a majority or for each light-emitting layer section 3112, 3122, 3132 and 3142, i.e. the light distribution or light intensity is "predistorted" (optically) for each channel to ensure, with a projection onto an oblique surface, a preferably uniform illumination or light intensity. The gradient of the change of intensity of the emitted light extends, for example for each one of the light-emitting layer sections 3112, 3122, 3132 and 3142, in parallel to the transparent electrode or to the electrodes.

Figure 15:
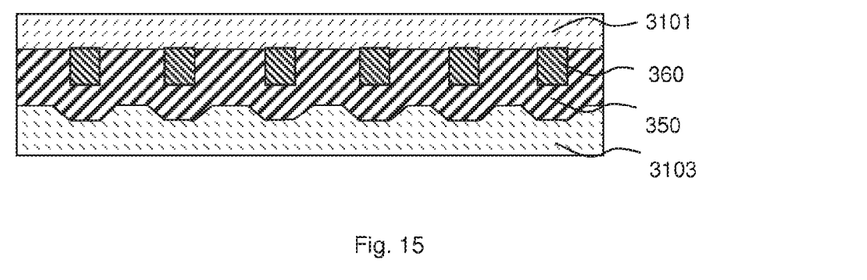
FIG. 15 shows a further exemplified embodiment of a light-emitting layer.
Figure 16:
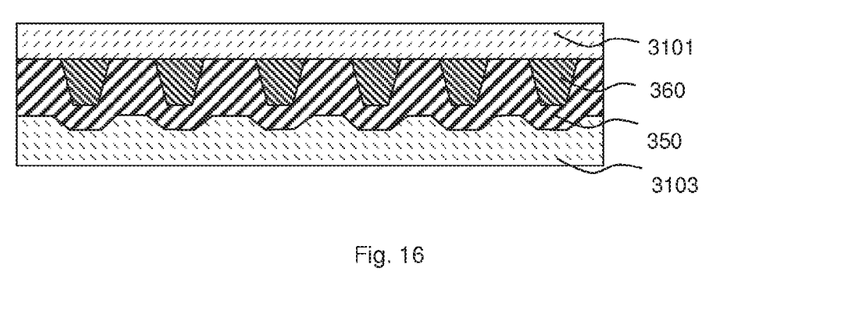
FIG. 16 shows a further exemplified embodiment of a light-emitting layer.
Figure 17:
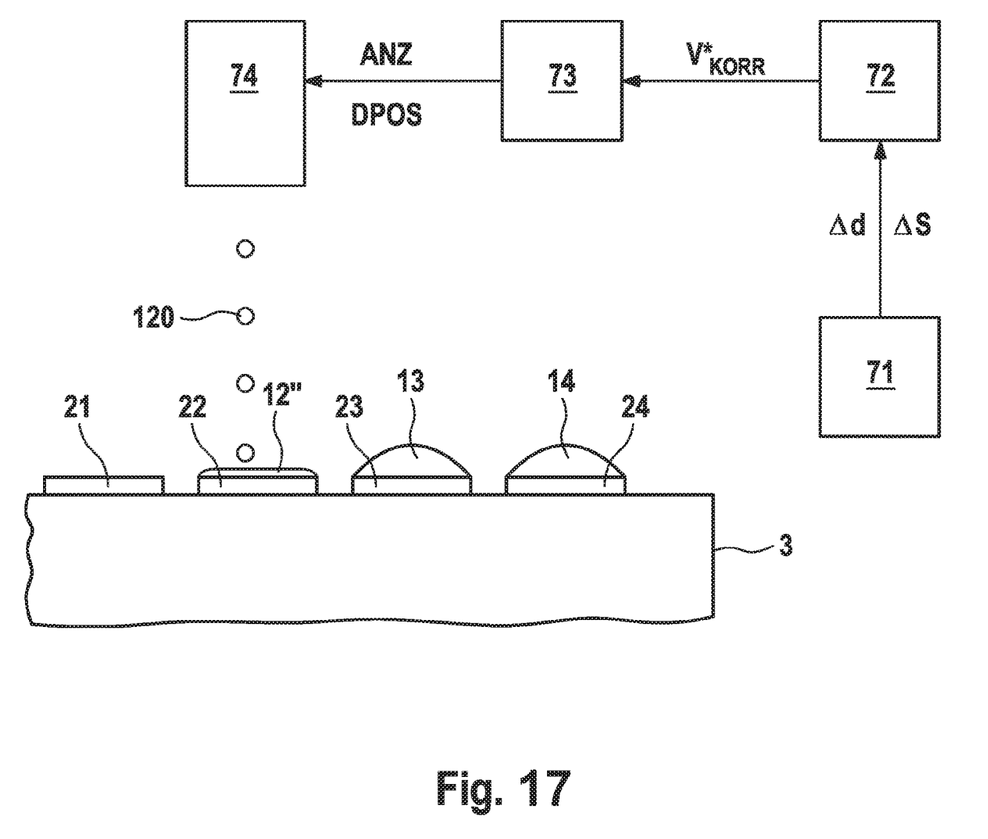
FIG. 17 shows an exemplified embodiment of a method of manufacturing a microprojector or a projection display.

The second region may moreover not completely separate the first region, but the second region may be embedded in the first region, as is represented, for example, in FIG. 5 and FIG. 4 of US 2011/0140151 A1. Corresponding exemplified embodiments are shown in FIG. 15, FIG. 16, and FIG. 17. Here, the second region 360 according to the exemplified embodiment of FIG. 16 has a conical design with respect to the second region 360 according to the exemplified embodiment of FIG. 15.

For the predistortion of the illumination power, to ensure a preferably uniform illumination power in case of an oblique projected area, the cone angle of the conical second region 360 may be changed in the course of the light-emitting layer, and the characteristic curve according to FIG. 2 of US 2011/0140151 A1 may be taken into consideration. Moreover, or as an alternative, the width of the first region 350 and/or the second region 360 may be varied.

For the manufacture of the microlens projector or a projection display, the projector lenses 11, 12, 13 and 14, as shown in FIG. 11 by way of example, are printed onto the support 3 or onto the coating 21, 22, 23, 24, respectively. To this end, a plurality of droplets 120 is printed onto one point by means of a print head 74, so that the droplets 120 join in their liquid state and form a drop mass 12' which grows, by the further addition of droplets, into a drop which will form the corresponding projector lens after curing, in this case the projector lens 12. To this end, the print head 74 obtains, from a printer driver 73, information on the number ANZ of droplets 120 to be printed and a position indication DPOS to indicate the position where the droplets 120 are to be placed. For example, the number of droplets 120 depends on the actual value of the thickness of the substrate 3 or the deviation ΔS of the actual value of the thickness of the substrate 3 (measured directly or with another wafer of the same batch) from its desired value S*, and/or the actual value of the diameter d of the coating islands 21, 22, 23, 24, or the deviation Δd of the diameter of the coating islands 21, 22, 23, 24 from their desired value d*. For example, the thickness of the substrate 3 also comprises the thickness of the respective coating 21, 22, 23, 24.

For example, by means of a sensor arrangement 71, the corresponding actual values or deviations Δd, ΔS are measured and supplied to a correction module 72 which outputs a corrected desired volume V*$_{KORR}$ to the printer driver 73. To this end, the correction module 72 comprises a corresponding characteristic or calculates e. g. the corrected desired volume V*$_{KORR}$ as follows:

$$V^*_{KORR}(\Delta S, \Delta d) = \frac{h^2 \pi}{3}(3R-h)$$

with $$h = R - \sqrt{R^2 - \frac{(d^* + \Delta d)^2}{4}}$$

and $$R = \frac{(S + \Delta S + \Delta f^*)(n_S - n)}{n_S}$$

Here, Δf* is the desired value for a defocussing of the object structure associated with the projector lens.

In the described manufacturing processes, for example first the object structures are applied onto the support 3, and subsequently the illumination layer. Then, the projector lenses 11, 12, 13, 14, or 11', 12', 13' and 14' are printed, wherein previously, the coating islands 21, 22, 23 and 24 are optionally applied or printed.

It is, for example, intended that a plurality of microprojectors or projection displays are produced on one wafer which is, upon completion of the microprojectors or projection displays, separated such that the finished microprojectors or projection displays are formed.

The invention also relates to a motor vehicle with an aforementioned projection display, e. g. a motor vehicle for autonomous driving. Here, the illumination layer may be controlled in response to the traffic situation. A motor vehicle in the sense of present disclosure is for example a land craft to be individually used in road traffic. Motor vehicles in the sense of present disclosure are for example not restricted to land crafts with an internal combustion engine.

The elements and layers in the Figures are drawn taking into consideration simplicity and clarity, and are not necessarily drawn to scale. For example, the dimensions of some elements or layers are represented in a clearly exaggerated manner with respect to other elements or layers to enhance the understanding of the exemplified embodiments of the present invention.

The present disclosure provides an inexpensive projection display. It is furthermore providing a particularly suited and/or inexpensive method of manufacturing a projection display.

Reference is made to DE 10 2009 024 894 A1 (cf. e. g. FIG. 1/FIG. 2 according to DE 10 2009 024 894 A1), U.S. Pat. No. 8,777,424 B2 (incorporated by reference in its entirety), and DE 10 2011 076 083 A1 (incorporated by reference in its entirety) for disclosure relating to method of manufacturing a projection display, comprising a(n) (integrated) microprojector, for example a(n) (integrated) microprojector.

The arrangement suggested in DE 10 2009 024 894 A1 consists of a regular arrangement of a plurality of condenser lenses, identical structures to be imaged and projector lenses. A light source illuminates a condenser lens array in the direct proximity of which an array of imaging structures is located. The respective object to be projected (imaging structure) is located in the focal length of the associated lens of the projector lens array. The corresponding condenser lens is located very close to the object, compared to the distance of the projector lens to the object, to ensure a Köhler illumination of the projector lens. The projector lens array according to DE 10 2009 024 894 A1 (incorporated by reference in its entirety) images a superposition of all individual frames on a screen. By using microlenses in a regular arrangement as projection lenses in a multi-channel architecture, it is possible according to DE 10 2009 024 894 A1 to reduce the overall length of the total system compared to conventional single-channel projectors of the same image brightness. While the small overall length of the microprojector results from the focal lengths of the lenses of only a few millimetres, the object area multiplication according to DE 10 2009 024 894 A1 provides a proportional increase of image brightness.

By a slightly reduced centre-to-centre spacing (pitch) of the projector lenses with respect to the imaging structures, an offset of the respective object and the corresponding projector optics increasing from the array's centre to the outside results. The thus formed slight tilt of the optical axes of outer projectors with respect to the central channel provides a superposition of the real individual images in a finite distance D onto the projected area provided for projection.

According to DE 10 2009 024 894 A1, the projection distance D of the microprojector results from the focal length f of the projector lens, the centre-to-centre spacing of the projector optics $P_{PL}$, and the centre-to-centre spacing of the images $P_{BL}$ (cf. FIG. 3 according to DE 10 2009 024 894 A1):

$$D = \frac{f^* p_{PL}}{p_{BL} - p_{PL}}$$

The enlargement M of the microprojector results from the ratio of the projection distance D to the focal length f of the projector lens:

$$M = \frac{D}{f} = \frac{p_{PL}}{p_{BL} - p_{PL}}$$

The projection display generates, according to DE 10 2009 024 894 A1, a two-dimensional projection onto a projected area, wherein according to DE 10 2009 024 894 A1, identical objects are projected. By the superposition of the projections of projector lenses with Köhler illumination, the microprojector according to DE 10 2009 024 894 A1 achieves the homogenisation of the light source in parallel to the projection.

The maximum opening angle of the light source must not exceed the acceptance angle of the condenser lens under which the exit pupil of the projector lens is completely illuminated, as otherwise, according to DE 10 2009 024 894 A1, parasitic images adjacent to the actual image can form. As an illumination, according to DE 10 2009 024 894 A1, e. g. very flat units, similar to the lightings of transmissive displays from behind (US 2008/0310160 A1), with adapted outcoupling structures may be used. The acceptance angle of peripheral individual projectors of the microprojector is, according to the aforementioned DE 10 2009 024 894 A1, restricted by the telecentric emission characteristic of the source compared to the central projector channel. An additional macroscopic condenser lens, e. g. in the form of a thin Fresnel lens, may annul this telecentrics according to DE 10 2009 024 894 A1 and thus, according to DE 10 2009 024 894 A1, further increase the overall brightness of the projection (FIG. 4 according to DE 10 2009 024 894 A1).

The application of suited light-conducting elements, e. g. concentrators, as a part of the condenser lens array may, according to DE 10 2009 024 894 A1, block the dead zones between the condenser lenses and thus significantly increase the filling factor (FIG. 5 according to DE 10 2009 024 894 A1). The use of so-called "chirped" lens arrays, i. e. lens arrays with parameters variable over the array (e. g. different focal lengths of the projector lenses over the array or different focal lengths tangentially and sagitally by designing them as elliptical lenses), may provide a correction of the defocus and the astigmatism of the peripheral projection patterns.

To suppress the influence of the distortion both of the individual channel and the superposition of all imaging channels, according to DE 10 2009 024 894 A1, a channelwise pre-distortion of the imaging structures is possible. The use of microlenses with short focal lengths is connected, according to DE 10 2009 024 894 A1, with a restriction of the transferable information. The representable image resolution is, according to DE 10 2009 024 894 A1, restricted by the superposition of aberrations and diffraction effects. An increase of the overall information transmission is, according to DE 10 2009 024 894 A1, possible by segmenting the projection image and assigning defined areas of the field of view to groups of individual projectors in a crossed arrangement within a microprojector (cf. FIG. 6/FIG. 7 according to DE 10 2009 024 894 A1).

A full-colour projection is enabled, according to DE 10 2009 024 894 A1, by interlacing three array projection displays according to the aforementioned DE 10 2009 024 894 A1, each of which representing one primary colour proportion of the image to be projected in the form of identical object structures (cf. FIG. 8/FIG. 9 according to DE 10 2009 024 894 A1). Furthermore, according to DE 10 2009 024 894 A1, a channel-wise chromatic error correction is possible which, compared to conventional single-channel projection systems with complex achromatised multi-lens projection lenses, represents a drastic simplification of the projection optics. If the object structure is generated by a digital imager that depicts, as image contents, an array of identical images in a variable pitch, the microprojector enables the representation of dynamic image contents.

By an electronic offset of the individual frames on the imager, according to DE 10 2009 024 894 A1, the projection distance may be controlled without mechanical components (see formula above for the projection distance D). In combination with a measurement of the distance to the projected area, according to DE 10 2009 024 894 A1, the projection distance may thus be electronically traced within a control loop. The imager may be, according to DE 10 2009 024 894 A1, e. g. a transmissive LCD display (cf. FIG. 10 according to DE 10 2009 024 894 A1).

It is an object of the present disclosure to provide an inexpensive projection display. It is furthermore an object of the present disclosure to provide a particularly suited and/or inexpensive method of manufacturing a projection display.

The invention claimed is:
1. Projection display comprising:
a transparent support;
a projector lens array with a plurality of projector lenses arranged on the transparent support;
an object structure array arranged on the transparent support on a side of the support facing away from the projector lens array, the object structure array comprising a plurality of essentially identical object structures, wherein at least one projector lens is associated with one object structure, such that the projections of the object structures superpose through the projector lenses to form an overall image; and
an illumination layer for illuminating the object structures, the illumination layer being arranged on the object structure array, wherein the illumination layer comprises a first electrode, a second electrode, and a light-emitting layer arranged between the first electrode and the second electrode, and wherein the first electrode is a transparent electrode, and wherein the projector lenses are comprised of a plurality of droplets printed by means of transparent ink, which plurality of droplets in their liquid state join into a drop which forms a projector lens after curing, wherein the number of droplets for two adjacent projector lenses is different;

wherein the light-emitting layer comprises a first region with a light-emitting material and a second region with a low-index material comprising an index of refraction that is smaller than the index of refraction of the light-emitting material;

wherein the second region is arranged adjacent to the first region in a multiply repeating manner;

wherein the low-index material forms a regular grid that is oriented in a plane parallel to the first electrode;

wherein the grid comprises a periodicity that is higher than the wavelength of visible light;

wherein the mean distance between grid lines is not more than five times the mean width of the grid lines.

2. Projection display according to claim 1, wherein the low-index material forms an irregular grid that is oriented in a plane parallel to the first electrode.

3. Projection display according to claim 1, wherein the low-index material forms a grid that is oriented in a plane parallel to the first electrode.

4. Projection display according to claim 3, wherein the mean distance between grid lines is not more than three times the mean width of the grid lines.

5. Projection display according to claim 3, wherein the mean distance between grid lines is not more than five times the mean width of the grid lines.

6. Projection display according to claim 1, wherein opaque intermediate elements are arranged between the object structures.

7. Projection display according to claim 6, wherein the opaque intermediate elements are reflective in the direction facing the first electrode.

8. Projection display according to claim 7, wherein the second electrode is a reflective electrode.

9. Projection display according to claim 1, wherein opaque intermediate elements are arranged between the object structures.

10. Projection display according to claim 9, wherein the opaque intermediate elements are reflective in the direction facing the first electrode.

11. Projection display according to claim 10, wherein the second electrode is a reflective electrode.

12. Projection display according to claim 1, wherein no condenser lens is arranged between the object structures and the illumination layer.

13. Projection display according to claim 12, wherein the distance between a projector lens and its associated object structure corresponds to the focal length of the respective projector lens.

14. Projection display comprising:
a transparent support;
a projector lens array with a plurality of projector lenses arranged on the transparent support, the projector lens array comprising a plurality of projector lenses;
an object structure array arranged on the transparent support on a side of the support facing away from the projector lens array, the object structure array comprising a plurality of essentially identical object structures, wherein at least one projector lens is associated with one object structure, such that the projections of the object structures superpose through the projector lenses to form an overall image; and
an illumination layer for illuminating the object structures, wherein the illumination layer comprises a first electrode, a second electrode, and light-emitting layer sections arranged between the first electrode and the second electrode, wherein the first electrode is a transparent electrode, and wherein the illumination layer is arranged on the object structure array, and wherein the projector lenses are comprised of a plurality of droplets printed by means of transparent ink, which plurality of droplets in their liquid state join into a drop which forms a projector lens after curing, wherein the number of droplets for two adjacent projector lenses is different;
wherein the light-emitting layer comprises a first region with a light-emitting material and a second region with a low-index material comprising an index of refraction that is smaller than the index of refraction of the light-emitting material, wherein the low-index material forms a grid that is oriented in a plane parallel to the first electrode;
wherein the mean distance between grid lines is not more than five times the mean width of the grid lines.

15. Projection display according to claim 14, wherein opaque intermediate elements are arranged between the object structures.

16. Projection display according to claim 15, wherein the opaque intermediate elements are reflective in the direction facing the first electrode.

17. Projection display comprising:
a transparent support;
a projector lens array with a plurality of projector lenses arranged on the transparent support;
an object structure array arranged on the transparent support on a side of the support facing away from the projector lens array, the object structure array comprising a plurality of essentially identical object structures, wherein at least one projector lens is associated with one object structure, such that the projections of the object structures superpose through the projector lenses to form an overall image; and
an illumination layer for illuminating the object structures, the illumination layer being arranged on the object structure array, wherein the illumination layer comprises a first electrode, a second electrode, and a light-emitting layer arranged between the first electrode and the second electrode, and wherein the first electrode is a transparent electrode, and wherein the projector lenses are comprised of a plurality of droplets printed by means of transparent ink, which plurality of droplets in their liquid state join into a drop which forms a projector lens after curing, wherein the number of droplets for two adjacent projector lenses is different;
wherein the light-emitting layer comprises a first region with a light-emitting material and a second region with a low-index material comprising an index of refraction that is smaller than the index of refraction of the light-emitting material;
wherein the second region is arranged adjacent to the first region in a multiply repeating manner;
wherein the low-index material forms a grid that is oriented in a plane parallel to the first electrode;
wherein the mean distance between grid lines is not more than three times the mean width of the grid lines.

* * * * *